(12) United States Patent
Buerger et al.

(10) Patent No.: US 9,692,278 B2
(45) Date of Patent: Jun. 27, 2017

(54) DC MOTOR FOR DRIVING ASSEMBLIES OF A MOTOR VEHICLE

(71) Applicant: PIERBURG GMBH, Neuss (DE)

(72) Inventors: Frank Buerger, Langerwehe (DE); Norbert Simons, Duesseldorf (DE); Rafael Soglowek, Duesseldorf (DE)

(73) Assignee: PIERBURG GMBH, Neuss (DE)

( * ) Notice: Subject to any disclaimer, the term of this patent is extended or adjusted under 35 U.S.C. 154(b) by 472 days.

(21) Appl. No.: 14/398,472

(22) PCT Filed: Apr. 5, 2013

(86) PCT No.: PCT/EP2013/057246
§ 371 (c)(1),
(2) Date: Nov. 3, 2014

(87) PCT Pub. No.: WO2013/164156
PCT Pub. Date: Nov. 7, 2013

(65) Prior Publication Data
US 2015/0091401 A1    Apr. 2, 2015

(30) Foreign Application Priority Data

May 4, 2012  (DE) ................. 10 2012 103 928

(51) Int. Cl.
*H02K 11/00*       (2016.01)
*H02K 5/22*        (2006.01)
(Continued)

(52) U.S. Cl.
CPC .......... *H02K 11/0073* (2013.01); *H02K 5/15* (2013.01); *H02K 5/225* (2013.01);
(Continued)

(58) Field of Classification Search
CPC .... H02K 11/026; H02K 5/225; H02K 11/024; H02K 11/40
(Continued)

(56) References Cited

U.S. PATENT DOCUMENTS

| 4,384,223 A | 5/1983 | Zelt |
| 4,853,576 A | 8/1989 | Mayumi |

(Continued)

FOREIGN PATENT DOCUMENTS

| DE | 10 2006 044 304 A1 | 3/2008 |
| DE | 10 2009 010 424 A1 | 9/2010 |

(Continued)

*Primary Examiner* — Thanh Lam
(74) *Attorney, Agent, or Firm* — Norman B. Thot

(57) ABSTRACT

A DC motor for driving components of a motor vehicle includes a housing radially surrounding a stator and a rotor. An end plate axially bond to the DC motor comprises a center which has a drive shaft project there-through, and two connection contacts projecting therefrom which supply a voltage to the DC motor. A printed circuit board has electronic components providing an interference-suppression arranged thereon. The printed circuit board comprises conductor paths, a central opening having the drive shaft projects there-through, and two plug-through openings having the two connection contacts project there-through. An earth connection device producing an earth connection of the printed circuit board is provided as a metal sheet arranged axially between the printed circuit board and the end plate. The metal sheet comprises a first contact element connected to the housing, and a second contact element connected to the conductor paths of the printed circuit board.

9 Claims, 3 Drawing Sheets

(51) Int. Cl.
*H02K 11/02* (2016.01)
*H02K 5/15* (2006.01)
*H02K 11/40* (2016.01)

(52) U.S. Cl.
CPC ....... *H02K 11/0094* (2013.01); *H02K 11/024* (2013.01); *H02K 11/40* (2016.01)

(58) Field of Classification Search
USPC .................................... 310/71, 72, 51, 68 R
See application file for complete search history.

(56) References Cited

U.S. PATENT DOCUMENTS

| | | | |
|---|---|---|---|
| 6,198,189 | B1 | 3/2001 | Takahashi |
| 6,740,999 | B1* | 5/2004 | Segawa .................... H02K 5/00 310/71 |
| 7,755,232 | B2* | 7/2010 | Winkler ............... H02K 11/026 310/51 |
| 2002/0105246 | A1 | 8/2002 | Ooyama |
| 2003/0151317 | A1* | 8/2003 | Yoshida ................. H02K 3/522 310/71 |
| 2003/0151318 | A1* | 8/2003 | Noda ..................... H02K 5/225 310/71 |
| 2008/0102652 | A1 | 5/2008 | Masaki |
| 2010/0117469 | A1* | 5/2010 | Niederer ................ H02K 11/40 310/71 |
| 2010/0141068 | A1* | 6/2010 | Silva .................... H02K 11/026 310/72 |
| 2010/0289388 | A1 | 11/2010 | Kimmich et al. |
| 2012/0181885 | A1* | 7/2012 | Yoo .................... G11B 19/2009 310/71 |

FOREIGN PATENT DOCUMENTS

| | | |
|---|---|---|
| DE | 10 2010 042 072 A1 | 4/2012 |
| JP | 61-126773 U | 8/1986 |
| JP | 2011-125202 A | 6/2011 |

* cited by examiner

DC MOTOR FOR DRIVING ASSEMBLIES OF A MOTOR VEHICLE

CROSS REFERENCE TO PRIOR APPLICATIONS

This application is a U.S. National Phase application under 35 U.S.C. §371 of International Application No. PCT/EP2013/057246, filed on Apr. 5, 2013 and which claims benefit to German Patent Application No. 10 2012 103 928.3, filed on May 4, 2012. The International Application was published in German on Nov. 7, 2013 as WO 2013/164156 A2 under PCT Article 21(2).

FIELD

The present invention relates to a DC motor for driving components of a motor vehicle having a housing which radially surrounds a stator and a rotor of the DC motor and which is produced from an electrically conductive material, an end plate which axially bounds the DC motor and out of the center of which a drive shaft of the DC motor projects, and out of which two connection contacts for supplying voltage to the DC motor project, wherein the end plate is produced from an electrically non-conductive material, a printed circuit board on which electronic components for interference-suppression are arranged and which has a central opening through which the drive shaft of the DC motor projects and which has two plug-through openings through which the connection contacts of the DC motor project, and means for producing a ground connection of the printed circuit board.

BACKGROUND

Electromagnetic interference radiation is generated by the use of DC motors regardless of whether these DC motors are commutated electronically or via brush rockers, the radiation having a negative influence, for example, on the operation of other electronic systems or hindering radio reception or radio communication. At the same time, the system itself is sensitive to interfering radiation from other electronic systems. It is thus common, particularly in the automobile industry, that the electromagnetic compatibility of electronic components must be proved. For this purpose, special interference-suppression circuits are used that are typically formed by a printed circuit board on which bypass capacitors and interference-suppression chokes are arranged which are connected through conductor paths. For the grounding of these electronic components, an earth contact must be made.

DE 10 2006 044 304 A1 describes an arrangement of an interference-suppression circuit in which two interference-suppression circuits and three bypass capacitors are used which are aligned with each other so that the electromagnetic field lines of a choke, which is connected with a terminal of the electric motor, are perpendicular to the electromagnetic field lines of a bypass capacitor that is connected with the same motor terminal. The connection to earth is realized either by soldering the opposite ends of the electric lines of the capacitors to the metal housing of the DC motor, or by clamping a nose, which is formed on a punched connecting line, between an end cap and the end plate of the DC motor.

DE 10 2009 010 424 A1 describes an electric motor for a motor vehicle aggregate having a printed circuit board on which choke coils and bypass capacitors are arranged as interference-suppression elements, the printed circuit board being arranged on the rear side of a plastic material body serving as a cover plate. The earth connection is formed by conductor paths potted in the plastic material body, which conductor paths are connected with the printed circuit board and are guided to connecting contacts that are connected with the metal housing, the connecting contacts having holes through which the screws protrude via which the connection between the connecting contacts and the ends of the conductor paths is made.

Producing an earth connection of the interference-suppression components with the known DC motors accordingly requires screwing or soldering the conductor paths to the housing of the DC motor. Clamping connections are possible in the known designs only if the end plate can serve as the earth connection, i.e., if it is electrically conductive.

SUMMARY

An aspect of the present invention is to provide a DC motor for driving components of a motor vehicle in which the earth connection can be made in a simple manner without increased assembly effort even when end plates of plastic material are used.

In an embodiment, the present invention provides a DC motor for driving components of a motor vehicle which includes a stator, a rotor, a housing configured to radially surround the stator and the rotor. The housing is produced from an electrically conductive material. An end plate is arranged to be axially bound to the DC motor. The end plate comprises a center configured to have a drive shaft project there-through, and two connection contacts projecting therefrom. The two connection contacts are configured to supply a voltage to the DC motor. The end plate is produced from an electrically non-conductive material. Electronic components are configured to provide an interference-suppression. A printed circuit board is configured to have the electronic components be arranged thereon. The printed circuit board comprises conductor paths, a central opening configured so that the drive shaft projects there-through, and two plug-through openings configured so that the two connection contacts project there-through. An earth connection device is configured to produce an earth connection of the printed circuit board. The earth connection device is provided as a metal sheet arranged axially between the printed circuit board and the end plate. The metal sheet comprises a first contact element configured to connect to the housing, and a second contact element configured to connect to the conductor paths of the printed circuit board.

BRIEF DESCRIPTION OF THE DRAWINGS

The present invention is described in greater detail below on the basis of embodiments and of the drawings in which.

DETAILED DESCRIPTION

Figure 1:
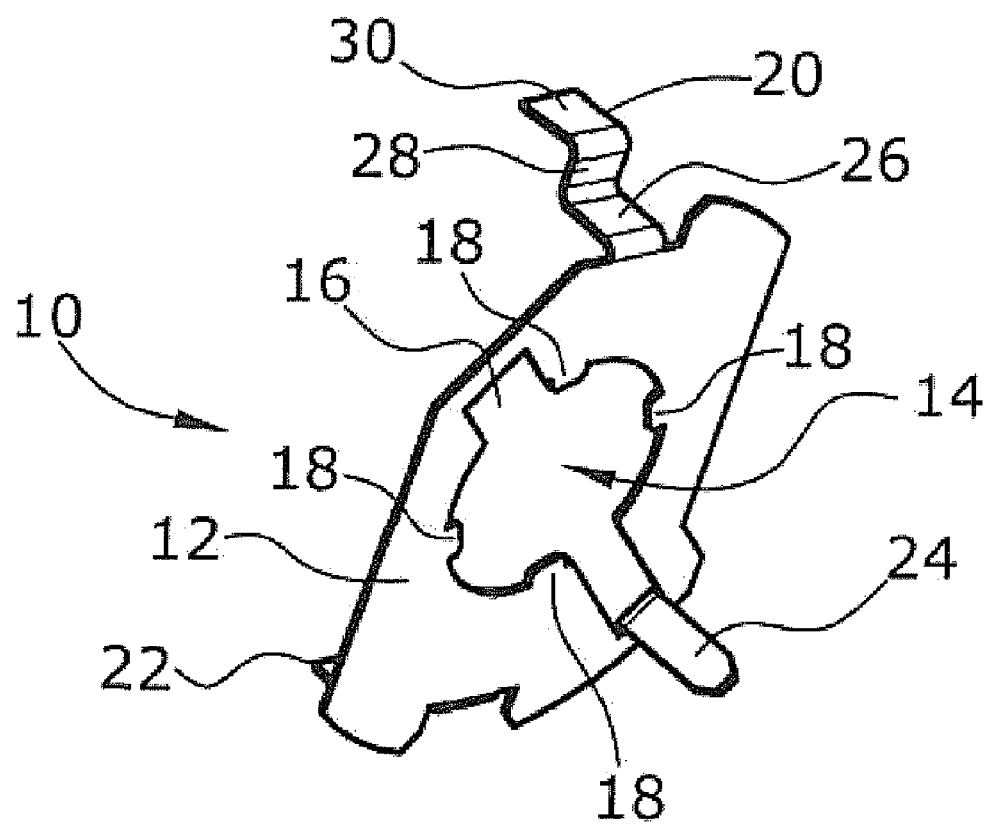
FIG. 1 shows a perspective view of a metal sheet for a DC motor of the present invention.

Due to the fact that, as the means for producing the earth connection of the printed circuit board, a metal sheet is arranged axially between the printed circuit board, which carries the electronic components for interference suppression, and the end plate, the metal sheet comprising a first contact element for connection with the housing and a second contact element for connection with conductor paths of the printed circuit board, it is possible to produce the earth connection by simply successively placing the metal sheet and the end plate onto the end plate of the DC motor. This results in a simple assembly without the necessity of subsequent fastening steps.

In an embodiment of the present invention, the metal sheet can, for example, be a stamped and bent part comprising a two-dimensional base sheet which rests on the end plate and from the radial edge portion of which the first contact element extends substantially axially towards the housing and the second contact element extends substantially axially towards the printed circuit board. Such a component can be produced at low cost and is suited for a simple spring-fix fastening of the second contact element to the printed circuit board.

In an embodiment of the present invention, the first contact element can, for example, have a first, axially extending section protruding into a recess in the end plate, a second, radially extending section resting axially on a free end of the housing through the recess in the end plate, and a third, axially extending section that contacts the housing radially. A double connection of the metal sheet with the housing can thus be realized without having to use fastening means, since, by placing the printed circuit board, the radial section is pressed against the housing forming the earth and the third section extends along the housing so that, given a corresponding design, it is also possible to generate a radial clamping force.

In an embodiment of the present invention, the metal sheet can, for example, have two first contact elements extending towards the housing so that the housing can be clamped between the two contact elements.

The two first contact elements are arranged substantially radially opposite each other and contact the housing under a radially inward directed bias. The spring force required for this purpose can be generated either by choosing the distance between the two first contact elements slightly smaller than the diameter of the housing or by bending the contact elements by more than 90° relative to the base body so that, upon assembly, the contact elements must first be pushed slightly apart. A durable fastening is thus achieved without any additional components.

In an embodiment of the present invention, the second contact element can, for example, be connected in an electrically conductive manner with the printed circuit board by an insulation displacement connection. Besides the simplicity of obtaining such a connection, this connection also has a long-term durability.

In an embodiment of the present invention, the end plate can, for example, comprise a central, axially extending cylindrical protrusion projecting through a central opening in the metal sheet, from which opening at least two noses extend towards the protrusion, the noses being in frictional engagement with a side wall of the protrusion. When the metal sheet is slipped on, a clamping connection with the end plate is thereby made via the noses so that an axial displacement of the metal sheet is largely excluded.

The end plate has an off-center axially extending protrusion projecting through an opening in the metal sheet in order to also prevent the metal sheet from turning on the end plate and to correspondingly define the angular position of the same. This facilitates assembly.

At least two interference-suppression chokes are arranged on the printed circuit board as electronic components for interference suppression purposes in order to provide the electromagnetic compatibility of the DC motor. Bypass capacitors can be useful supplements to the circuit on the printed circuit board.

A DC motor of such design, having an interference-suppression circuit, can be assembled with little effort by a simple plugging operation. A reliable earth connection of the interference-suppression components is at the same time provided. A fastening by soldering, welding, clips or screws can be omitted altogether, thereby reducing manufacturing and material costs.

An embodiment of the present invention is illustrated in the drawings and will be described hereunder.

FIG. 1 shows a metal sheet 10 made by a stamping and bending process. It comprises a base sheet 12 with a central, substantially circular opening 14 that is enlarged on one side so that, in addition, an off-center opening 16 in the form of a rectangle extends from the circular opening 14. From the radially inner edge of the base sheet 12, four noses 18 extend radially inward into the circular opening 14, mutually offset by 90°.

In the shown embodiment, a total of three contact elements 20, 22, 24 extend in the axial direction from a radially outer edge portion of the base sheet 12. Two first contact elements 20, 22 are arranged offset substantially by 180° from each other and extending parallel to each other in a first axial direction. Both first contact elements 20, 22 have a first section 26 that extends axially and from which a second section 28 extends radially outward, the second section 28 thus being bent by 90° with respect to the first section 26. From the second section 28, a third section 30 extends in the same direction as the first section 26, the third section 30 being bent by 90° relative to the second section 28. The second contact element 24 extends axially from the base sheet 12 in the opposite direction.

Figure 2:
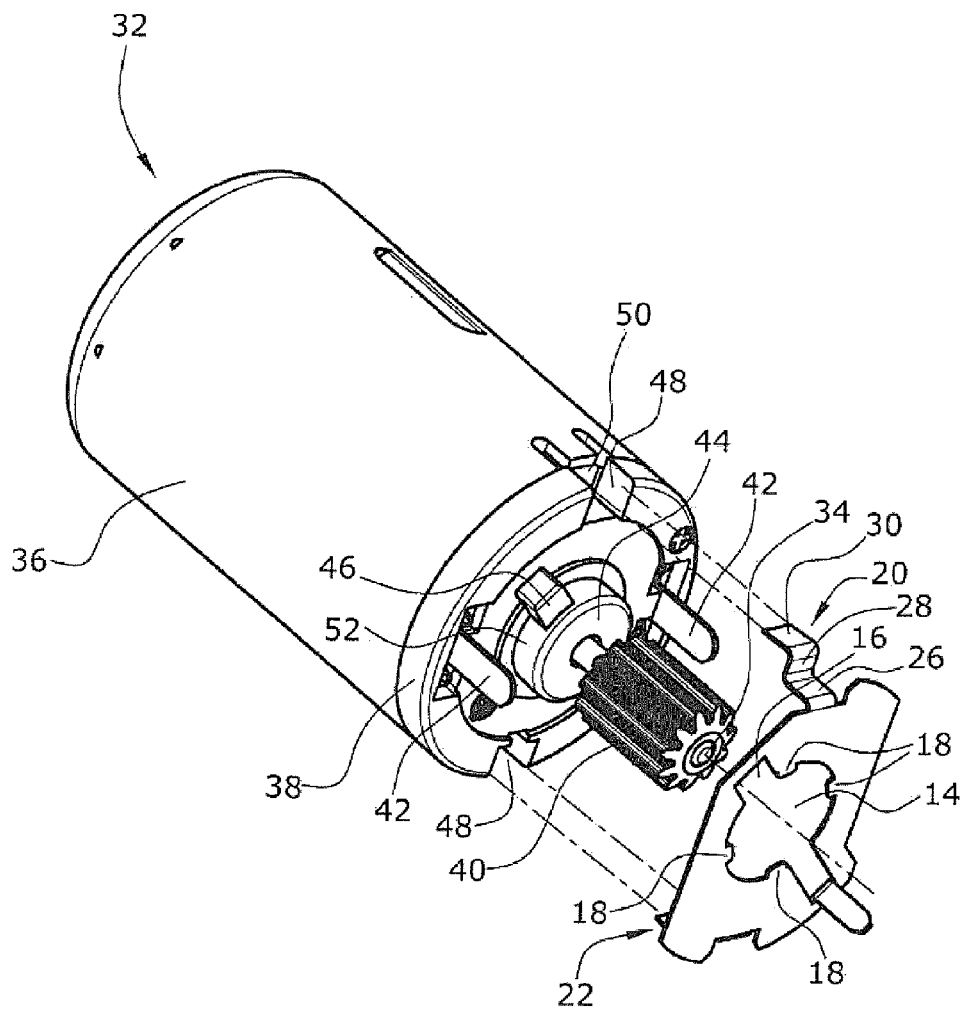
FIG. 2 shows a perspective illustration of a DC motor of the present invention with the metal sheet placed thereon.

FIG. 2 shows the position of the metal sheet 10 on a DC motor 32. The DC motor 32 comprises a rotor (not shown in the drawings) which is arranged on a drive shaft 34, as well as a stator, which are both arranged in a housing 36 that, in the shown embodiment, is designed as a pole tube. The housing 36 is made from an electrically conductive material that radially surrounds the stator and the rotor.

The front side of the DC motor 32, i.e., the axial end from which the drive shaft 34 protrudes, is closed with an end plate 38 of plastic material. The axial end of the drive shaft 34 has a pinion 40 mounted thereon which meshes with a gear of a downstream gearing of an actuating device, for example. Next to the drive shaft 34, two connecting contacts 42 of the stator protrude outward through the end plate 38.

The end plate 38 is substantially circular in shape and has an axially extending cylindrical protrusion 44, an off-center cuboid protrusion 46 of the same height being provided on one side thereof. Two opposing recesses 48 are further formed in the radial end portion of the end plate 38 through which an axial end 50 of the housing 36 is respectively exposed.

When the metal sheet 10 is pressed onto the end plate 38, the cylindrical protrusion 44 extends through the central opening 14 in the metal sheet, the diameter of the opening being only slightly larger than the diameter of the cylindrical protrusion 44 so that the noses 18 make a frictional engagement with the side walls 52 of the cylindrical protrusion 44. An axial displacement of the metal sheet 10 relative to the end plate 38 is thereby prevented.

The off-center cuboid protrusion 46 serves to define the angular position of the metal sheet 10 on the end plate 38, the off-center cuboid protrusion 46 having substantially the same shape as the off-center opening 16 in the metal sheet 10 through which the off-center cuboid protrusion 46 extends after the metal sheet 10 has been set in place. In this manner, the position of the two first contact elements 20, 22 relative to the end plate 38 is also defined, the first sections 26 of the elements in this position engaging into the two recesses 48 in the radially outer portion of the end plate 38. When the metal sheet 10 is pressed against the end plate 38, the respective contact element 20, 22 is also pressed with its radially extending second section 28 against the respective free end 50 of the housing 36. The respective third section 30 should contact the housing 36 from radially outside. The contact elements 20, 22 can be bent by slightly more than 90° at least in the transition from the second section 28 to the third section 30 to provide this contact. In such an embodiment, the third sections 30 are pre-tensioned to contact the housing 36 from outside under the action of a spring force. Since they are arranged offset by 180°, the housing 36 is loaded with the spring force in opposite directions so that the housing 36 is clamped between the first contact elements 20, 22.

Figure 3:
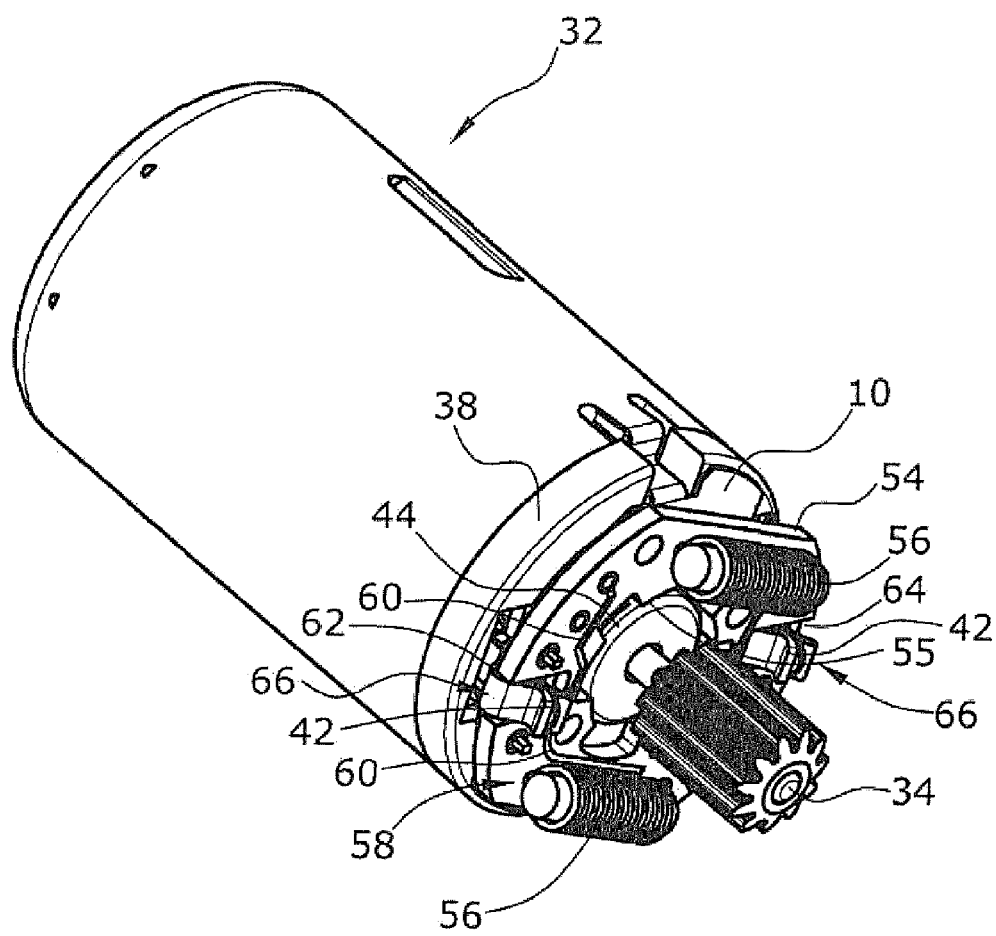
FIG. 3 shows a perspective illustration of the DC motor of FIG. 1 with the printed circuit board placed thereon.

FIG. 3 shows a printed circuit board 54 with a central opening 55 that is placed over the metal sheet 10, the drive shaft 34 of the DC motor 32, and the protrusions 44, 46 of the end plate 38 extending through this opening. Two interference-suppression chokes 56 arranged in parallel with each other, as well as three capacitors 58 arranged on the printed circuit board 54, and are connected via conductor paths 60. The interference-suppression chokes 56 and the capacitors 58 serve as components for interference suppression, i.e., for improving the electromagnetic compatibility of the DC motor 32.

The interference-suppression wiring is formed on the printed circuit board 54 and comprises two strands by which the motor contacts 42 are respectively connected with a voltage source via an interference-suppression choke 56. These two strands are connected with each other via a parallel connection of a capacitor 58 with a series connection of two capacitors 58 and a series connection of two resistors. A conductor path 60 directed to earth is branched off between the two capacitors 58 and the two resistors.

The connection to earth, which is formed by the housing 36, and to the DC motor 32 is effected through three passage openings 62, 64 (only two of which are shown in FIG. 3) through which the connecting contacts 42 of the DC motor 32 and the second contact element 24 of the metal sheet 10, respectively, extend from the side of the end plate 38. At these passage openings 62, 64, an omega contact 66 is respectively formed which is connected with the conductor paths 60 of the printed circuit board 54 and clamps the second contact element 24 and the connecting contacts 42 in a manner known per se for electric connection.

The metal sheet 10 serves as a means for making an earth connection for the printed circuit board and that thereby a reliable connection of the interference-suppression circuit to earth can be made without having to use additional components. Additional assembly steps, in which screwing, welding, or soldering are required, can also be omitted, whereby the mechanical or thermal load during assembly is also reduced.

It should be clear that the scope of protection is not restricted to the embodiment described. Structural modifications of the metal sheet design or different wirings for interference suppression are of course possible without departing from the scope of protection defined by the claims. Reference should be had to the appended claims.

What is claimed is:

1. A DC motor for driving components of a motor vehicle, the DC motor comprising:
   a stator;
   a rotor;
   a housing configured to radially surround the stator and the rotor, the housing being produced from an electrically conductive material;
   a drive shaft;
   an end plate arranged to be axially bound to the DC motor, the end plate comprising a center configured to have the drive shaft project there-through, and two connection contacts projecting therefrom, the two connection contacts being configured to supply a voltage to the DC motor, the end plate being produced from an electrically non-conductive material;
   electronic components configured to provide an interference-suppression;
   a printed circuit board configured to have the electronic components be arranged thereon, the printed circuit board comprising conductor paths, a central opening configured so that the drive shaft projects there-through, and two plug-through openings configured so that the two connection contacts project there-through; and
   an earth connection device configured to produce an earth connection of the printed circuit board, the earth connection device being provided as a metal sheet arranged axially between the printed circuit board and the end plate, the metal sheet comprising a first contact element configured to connect to the housing, and a second contact element configured to connect to the conductor paths of the printed circuit board.

2. The DC motor as recited in claim 1, wherein the metal sheet is provided as a stamped and bent part comprising a two-dimensional base sheet configured to rest on the end plate, the metal sheet further comprising a radial edge portion configured so that the first contact element extends substantially axially towards the housing and the second contact element extends substantially axially towards the printed circuit board.

3. The DC motor as recited in claim 1, wherein,
   the end plate further comprises a recess,
   the housing further comprises a free end, and
   the first contact element comprises a first axially extending section configured to protrude into the recess in the end plate, a second radially extending section configured to rest axially on the free end of the housing through the recess in the end plate, and a third axially extending section configured to radially contact the housing.

4. The DC motor as recited in claim 1, wherein the metal sheet further comprises two first contact elements configured to extend towards the housing.

5. The DC motor as recited in claim 4, wherein the two first contact elements are arranged substantially radially opposite each other so as to abut against the housing with a radially inward directed bias.

6. The DC motor as recited in claim 1, further comprising an omega contact or an insulation displacement connection, wherein the second contact element is electrically connected with the printed circuit board via the omega contact or via the insulation displacement connection.

7. The DC motor as recited in claim 1, wherein,
   the metal sheet further comprises a central opening from which at least two noses are configured to project, and
   the end plate further comprises a central axially extending cylindrical protrusion comprising a side wall, the central axially extending cylindrical protrusion being configured to project through the central opening in the metal sheet so that the at least two noses are in a frictional engagement with the side wall of the protrusion.

8. The DC motor as recited in claim 7, wherein,
the metal sheet further comprises an opening, and
the central axially extending cylindrical protrusion further comprises an off-center axially extending protrusion which is configured to project through the opening in the metal sheet.

9. The DC motor as recited in claim 1, further comprising two interference-suppression chokes arranged on the printed circuit board, the two interference-suppression chokes being configured as electronic components so as to provide the interference suppression.

* * * * *